United States Patent [19]

Campbell

[11] Patent Number: 5,056,255

[45] Date of Patent: Oct. 15, 1991

[54] FISHING ROD JIGGING APPARATUS

[76] Inventor: Richard A. Campbell, 34 St. James Square, Huntsville, Ala. 35801

[21] Appl. No.: 589,778

[22] Filed: Sep. 28, 1990

[51] Int. Cl.$^5$ ..................... A01K 91/06; A01K 97/01; A01K 97/10

[52] U.S. Cl. ..................... 43/19.2; 43/26.1; 43/15

[58] Field of Search .......................... 43/15, 19.2, 26.1

[56] References Cited

U.S. PATENT DOCUMENTS

| 3,691,668 | 9/1972 | Strebig | 43/19.2 |
|---|---|---|---|
| 3,813,806 | 6/1974 | Nishida | 43/15 |
| 3,839,810 | 10/1974 | Lagasse | 43/19.2 |
| 4,420,900 | 12/1983 | Nestor | 43/26.1 |
| 4,597,215 | 7/1986 | Otremba | 43/19.2 |
| 4,660,317 | 4/1987 | Evans | 43/19.2 |
| 4,811,514 | 3/1989 | Jordan | 43/15 |
| 4,890,409 | 1/1990 | Morgan et al. | 43/19.2 |

Primary Examiner—Richard K. Seidel
Assistant Examiner—Jeanne M. Elpel
Attorney, Agent, or Firm—Phillips & Beumer

[57] ABSTRACT

A fishing rod jigging apparatus includes features for imparting repeated normal cycles of up and down motion to the rod and for rapid upward movement overriding the normal cycle in the event of a bite on the line is sensed. The apparatus has an arm connected to a rod holder and rotatably secured on an axis transverse to the arm. A motor drives an inner shaft defining the axis of rotation, and an outer shaft connected to the arm is disposed around and concentric to the inner shaft. Movement of the arm though a portion of the revolution such as 30 degrees is obtained by actuating the inner shaft so that a radially extending pin on the shaft engages the end of a partial circumferential slot in the outer shaft. Switches engageable by the outer end of the pin are connected to circuitry that turns the motor off and on as required. Rapid upward movement responsive to increased line tension is provided by a solenoid-actuated shaft that engages a radially extending tab on the outer shaft. Circuitry is provided for overriding the normal up and down cycle in such an event. Electronic control features are provided, including a control panel and circuitry for varying the speed of the motor.

8 Claims, 8 Drawing Sheets

FISHING ROD JIGGING APPARATUS

FIELD OF THE INVENTION

This invention relates to powered devices for supporting and imparting jigging motion to fishing rods.

BACKGROUND OF THE INVENTION

Fishing by jigging is carried out by repeatedly raising and lowering a fishing pole or rod having an attached lure that is moved upward and downward in the water until a strike occurs. When carried out manually, the lure is allowed to gravitate downward at its own pace, thereby inducing a fluttering action, and is pulled upward more rapidly to begin a new cycle. Normally, fish strike the lure during the drop or when the lure is fluttering. It is desired to provide a powered jigging device which automatically provides such a jigging cycle and which also provides a more rapid hook-setting upward motion of the rod when a bite occurs.

Various powered jigging devices are disclosed in prior patents. U.S. Pat. No. 4,811,514, issued Mar. 14, 1989, to Jordan, discloses a device that uses a cam follower mechanism to provide cycles of up and down motion and includes a bypass switch to obtain rapid upward movement for setting the hook when a bite is sensed. This device provides a slow rise and quick falling action of the lure. Lindell et al. in U.S. Pat. No. 4,680,885, issued July 21, 1987, disclose a jigging device employing a reversible stepper motor to obtain a desired jigging cycle. U.S. Pat. No. 4,660,317, issued Apr. 28, 1987, to Evans, discloses apparatus in which movement of a rod is obtained from a motor-driven shaft, with a variable control device being used to control speed, direction, and limits of rotation. A load sensor incorporated in the rod holder is responsive to excessive load on the shaft to disconnect power upon sensing of excess torque on the shaft. Other motor-driven jigging devices that provide for variable oscillatory motion are disclosed in U.S. Pat. Nos. 4,972,215, issued July 1, 1986, to Otremba, and 4,100,695, issued July 18, 1978, to Blanchard. Still other devices as exemplified by U.S. Pat. No. 3,691,668, issued Sept. 19, 1972, to Strebig, employ a solenoid to provide cycles of oscillatory motion. While these patents separately show various mechanical and electrical features performing desired functions in a fish jigger, an improved jigging device that incorporates in a single device is desired. In particular, the improved device should provide features for performing cycles of oscillatory motion, rapid upward movement of the rod upon sensing of a bite, and variable control means, to include means adapted to allow the lure to fall at its own rate in the downward phase of each cycle, which may be different than the rate on the upward cycle.

SUMMARY OF THE INVENTION

This invention is directed to a fishing rod jigging apparatus for removably supporting a fishing rod and imparting to the rod repeated cycles of up and down jigging motion of the rod and operably coupled therewith means for sensing a bite on the lure and, in response thereto, rapidly moving the rod tip upward to set the lure in the mouth of the fish. Means are also provided for controlling the jigging cycle to include varying the rate of moving the rod tip downward so as to obtain an optimum cycle for a particular lure.

The apparatus may include an arm for removably supporting a fishing rod for angular movement of the rod up and down and in the same plane as the arm. The arm is disposed for rotation around a motor-driven shaft disposed transverse to the arm. Motion of the arm is brought about between a radially extending pin secured to the inner shaft making contact with the end of a radially and partially circumferentially extending slot of an outer shaft disposed over the inner shaft, the arm being fixedly attached to the outer shaft. Control of the extent of movement of the arm is provided by limit switches actuated by the outer end of the pin upon reaching electrical contacts. The limit switches are coupled to motor controls that reverse the cycle of motor at the angular position desired for a particular cycle. Upon completion of an upward stroke of the jigging cycle, downward movement of the rod and the lure coupled thereto is allowed to proceed by action of gravity. Means including a line-tension sensor for detecting a bite and a mechanism for rapidly projecting the arm upward in response thereto are also provided. The apparatus provides effective capability for performing the various functions discussed above, including features that enable adjustable control over the jigging cycle and provide a highly sensitive mechanism for sensing a bite on the line. The invention is embodied by a portable, battery-powered apparatus having automated control features.

It is, therefore, an object of the invention to provide apparatus for imparting cycles of limited up and down motion to a tip of a supported fishing rod.

Another object is to provide fishing rod jigging apparatus that moves a fishing rod tip upward rapidly when a bite occurs.

Another object is to provide adjustable means for controlling the jigging cycle in such apparatus.

Yet another object is to provide such an apparatus in which the downward portion of the jigging cycle may be adjusted to provide an optimum rate for a particular lure.

Other objects and advantages of the invention will be apparent from the following detailed description and the appended claims.

DESCRIPTION OF THE PREFERRED EMBODIMENT

Figure 1:
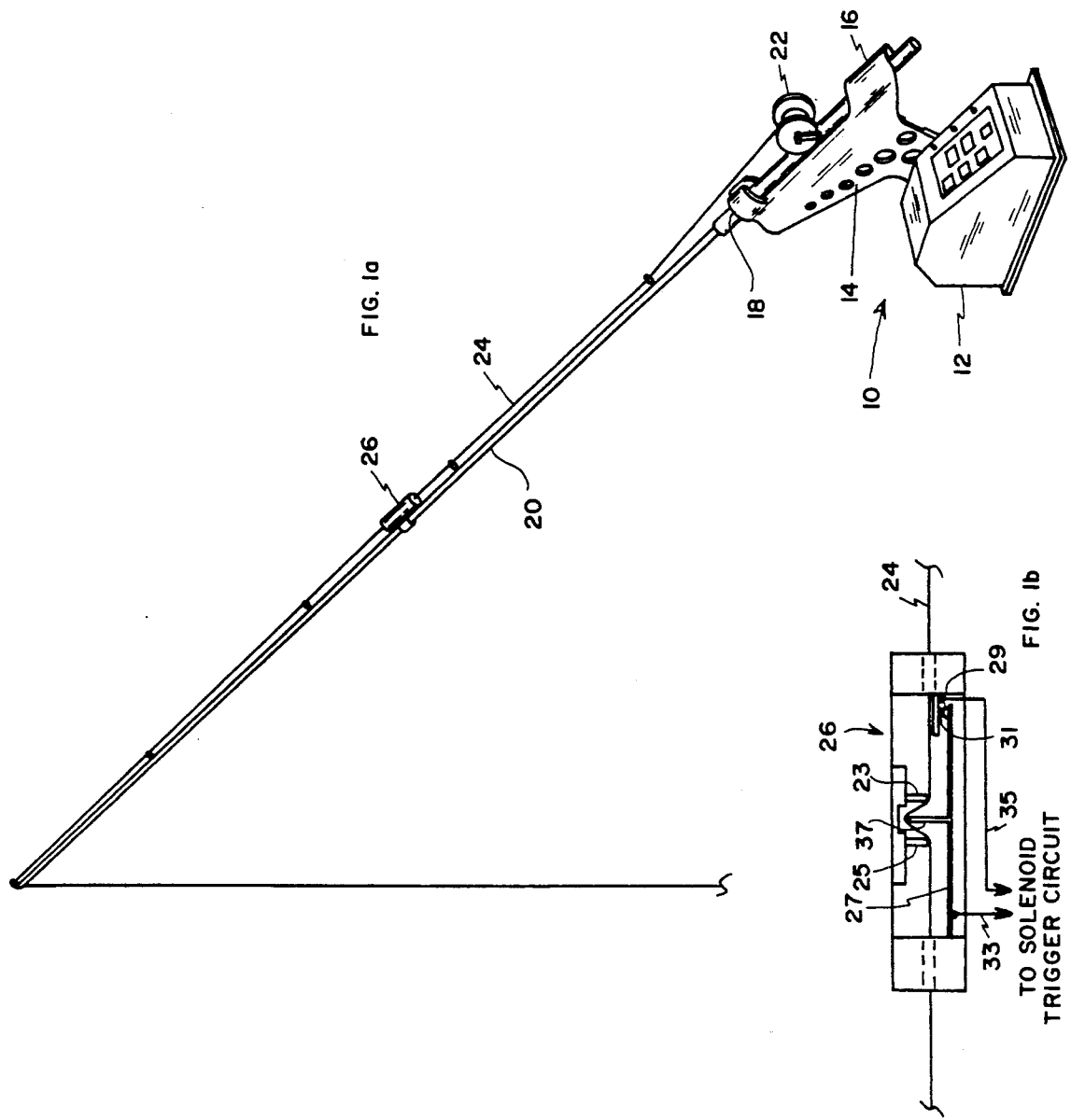
FIG. 1a is a perspective view showing apparatus embodying the invention with a fishing rod in place.
FIG. 1b is a sectional view showing details of a line tension sensor employed in the apparatus of this invention.

Referring to FIG. 1a of the drawings, there is shown apparatus 10 embodying the invention and having a generally rectangular box-like housing 12 in which an arm 14 is rotatably mounted on an axis transverse to the housing for limited movement as described below. The arm has a receptacle 16 and a clip 18 for receiving the handle end of a fishing rod 20 which supports a reel 22 on which a line 24 is wound. The rod and reel may comprise conventional bait-casting or spin-casting combinations, and the invention is not to be understood as limited to a particular type of rod or reel. The line is threaded past arms 23 and 25 (FIG. 1b) of a tension sensor switch 26 that provides an electrical signal to control circuitry responsive to increased line tension indicative of a bite on a lure or hook attached to the line. Sensor 26, which may be secured to the rod by being clamped on, has a leaf spring 27 disposed to bias contacts 29 and 31 together, providing a normally closed circuit through wires 33 and 35 coupled to the contacts. A projecting arm 37, affixed perpendicular to the spring and near the middle thereof, is disposed in contact with line 24 so as to be moved downward, forcing the contacts apart and opening the circuit, upon increasing the line tension. The open circuit condition activates the solenoid through a triggering circuit.

Figure 2:
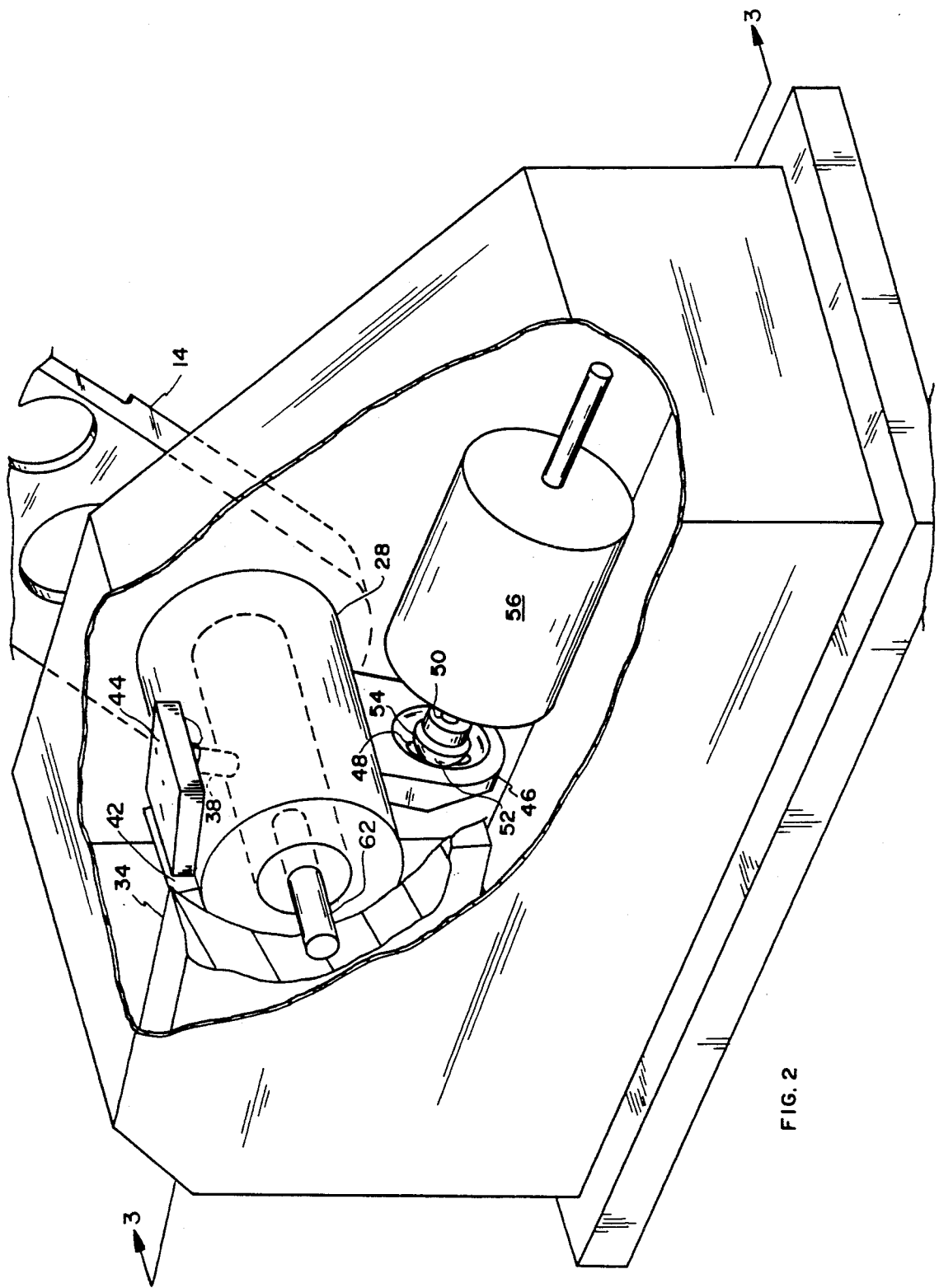
FIG. 2 is a perspective view, partially broken away, showing the drive mechanism for actuating a rod-supporting arm.
Figure 3:
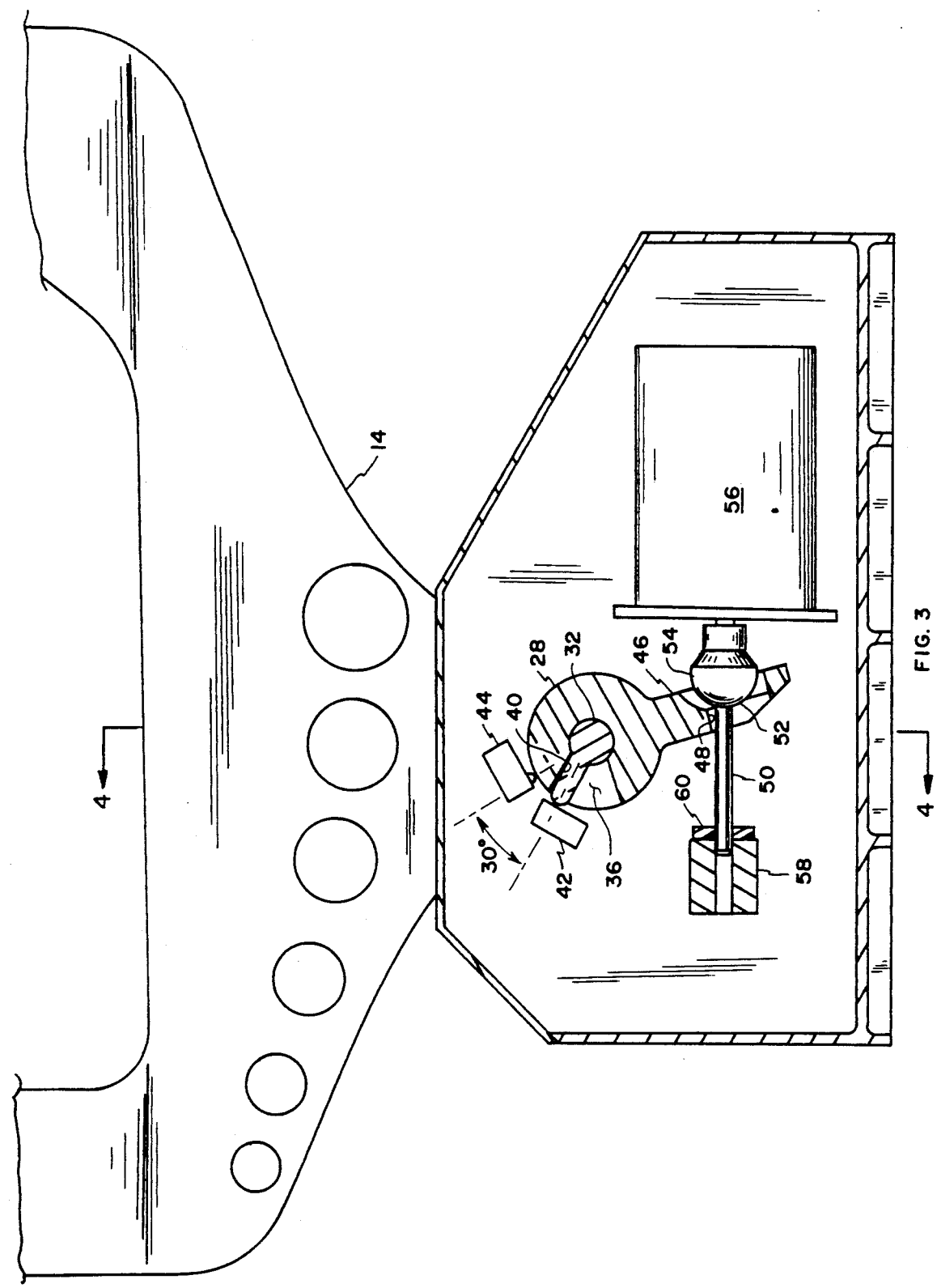
FIG. 3 is a sectional view when taken along line 3—3 of FIG. 2.
Figure 4:
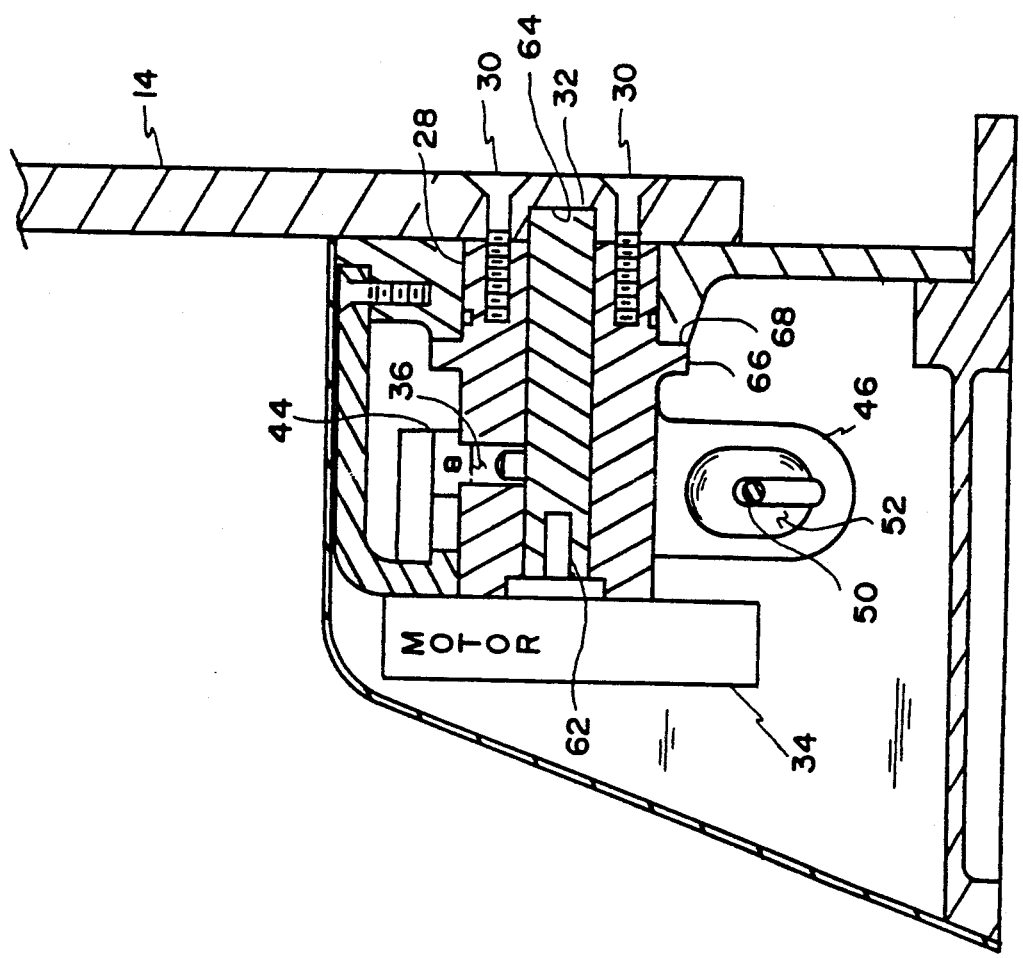
FIG. 4 is a sectional view taken along line 4—4 of FIG. 3.

As shown in FIGS. 2, 3, and 4, rod-supporting arm 14 is fixedly attached to an outer shaft 28 by screws 30, the outer shaft being disposed over inner shaft 32, which in turn is connected for being rotated within limits by D.C. motor 34. The outer shaft has a radially extending slot 36 over a segment such as 45 degrees of its circumference at a location near the middle of its length. Pin 38 affixed to and extending radially from shaft 32 resides in the slot and propels the arm upward upon contacting slot end 40 so as to rotate outer shaft 28. Control of movement of the outer shaft in normal jigging cycles is provided through microswitches 42 and 44 activated by contact 45 at the outer end of pin 38. The microswitches are spaced 30 degrees apart from one another and define the beginning and end of upward movement in each cycle.

Opposite from the slot in outer shaft 28 a radially projecting extension 46 is provided to enable projection of the arm upward upon sensing of a bite. The extension has an aperture 48 to receive shaft 50 and a rounded, indented surface 52 shaped to receive and be propelled by knob 52 secured to shaft 50 of solenoid 56. The outer end of the shaft travels in a bushing 58 that has a shock absorbing pad 60 on the side facing the solenoid. Actuation of the solenoid overrides normal operation of the jigging cycle and provides rapid upward movement of the arm regardless of the location of the arm at the time of actuation. Slot 36 extends past microswitch 42 an increment such as 15 degrees to provide room for farther upward movement even when the arm is at its normal uppermost position when a bit occurs.

Shaft 32 is fixedly secured to output shaft 62 of motor 34 at one end and is journalled in recess 64 of arm 14 at its other end to enable rotation with respect to the arm. Outer shaft 28 is provided with a radially extending flange 66 around its circumference disposed against mating surface 68 of the housing wall in order to maintain the outer shaft in the desired alignment.

Figure 6:
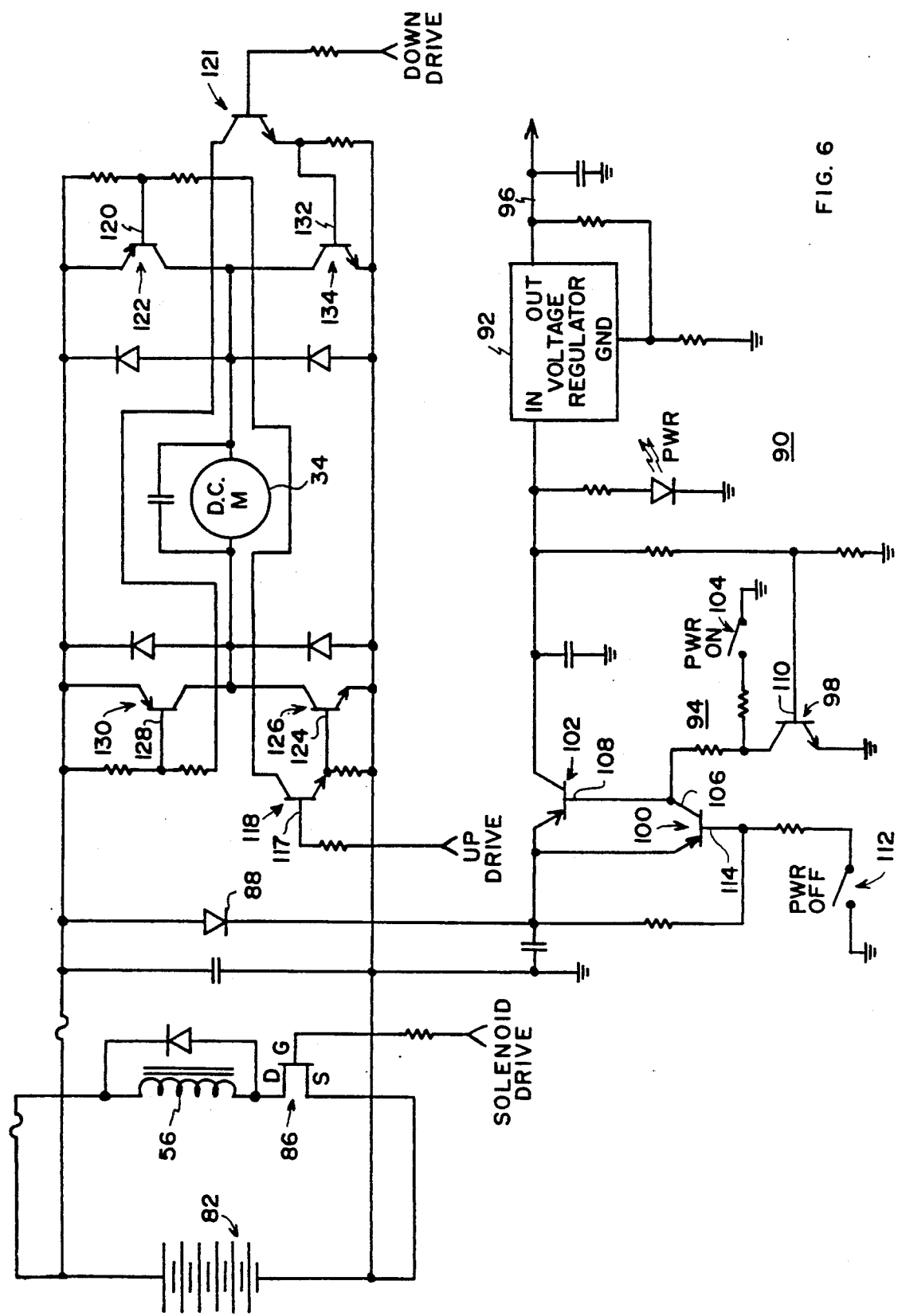
FIG. 6 is a schematic diagram of the motor drive and power control circuitry of the apparatus.
Figure 7:
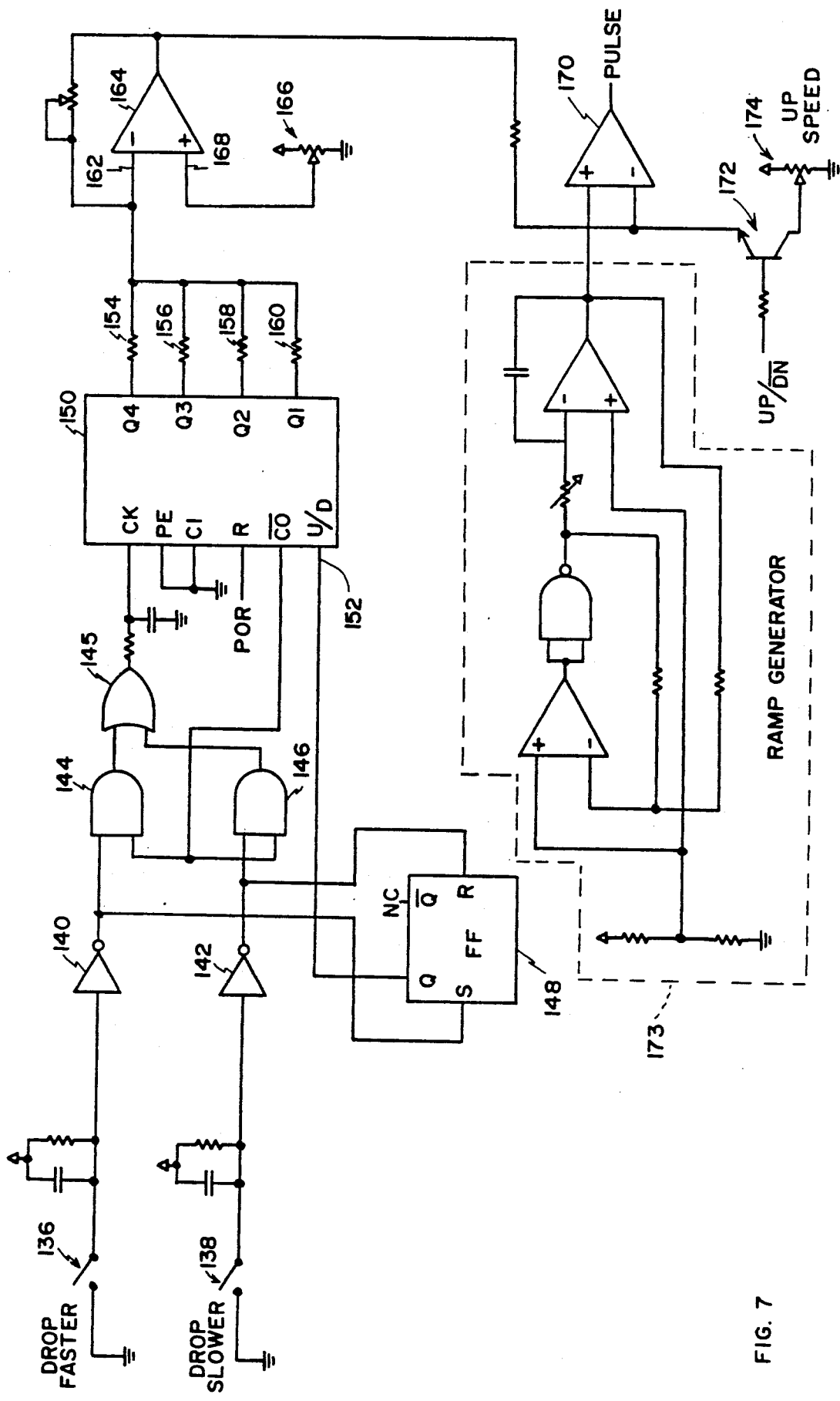
FIG. 7 is a schematic diagram of circuitry for the control of rate of jigging of the apparatus.
Figure 8:
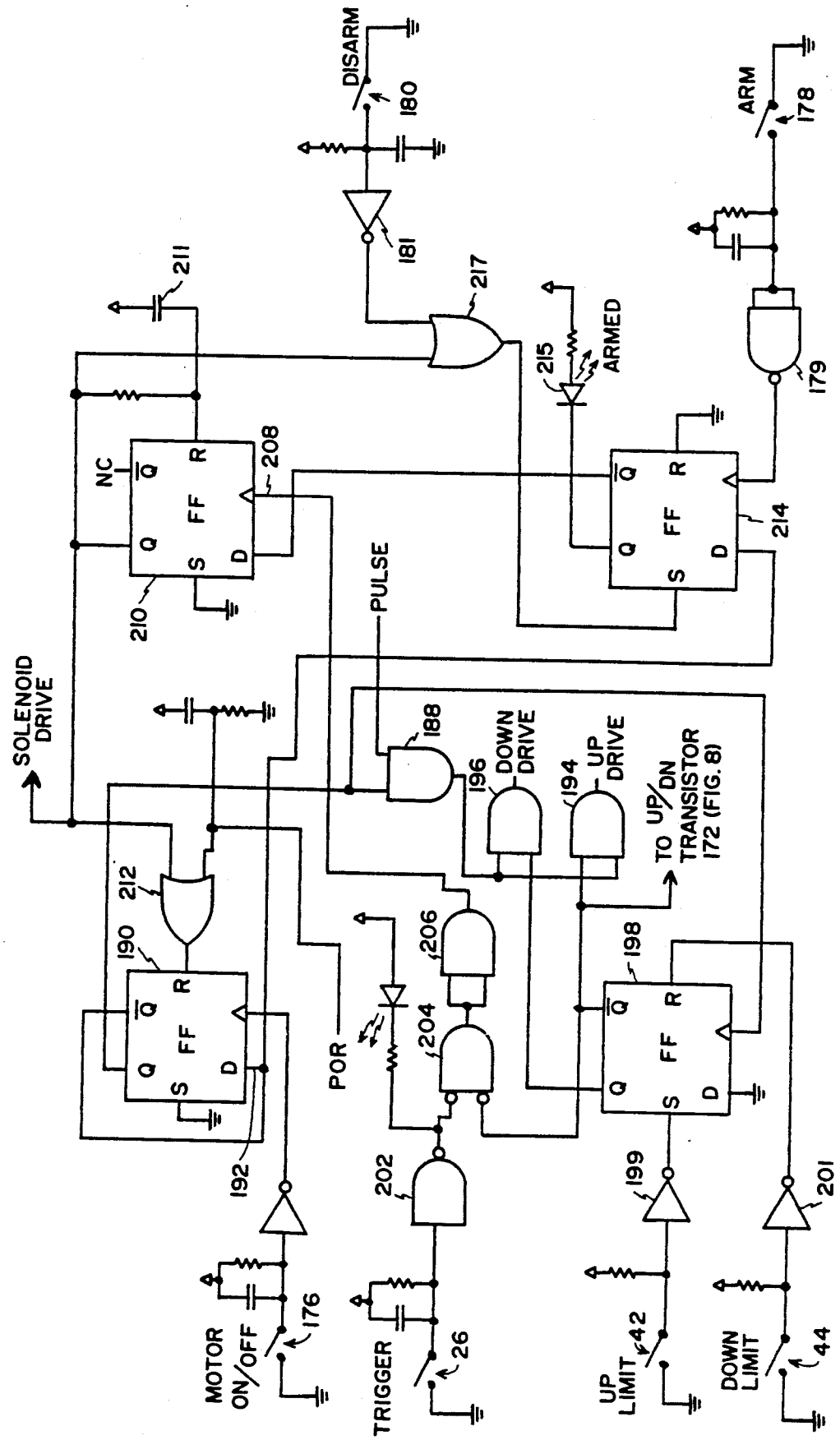
FIG. 8 is a schematic diagram of control circuitry of the apparatus.

FIGS. 6, 7, and 8 show in schematic form electrical components for actuating and controlling operation of the apparatus. Beginning with FIG. 6, a power source, such as 12-volt battery 82, is connected to power a fish-hooking solenoid 56 through a driver FET 86 connected to provide power to solenoid 56 when triggered by a fish taking the bait, as described above. Battery 82 is also coupled via a protection diode 88 to a power control and regulation circuit 90 consisting of a conventional monolithic voltage regulator 92 with its ancillary components, which regulator provides power to solid state components of the system on output lead 96 and a power latch circuit 94 disposed to energize regulator 92. Latch circuit 94 utilizes a latching transistor 98 and transistors 100 and 102, transistor 102 coupled to provide battery power to regulator 92. Latch circuit 94 functions such that when "power on" switch 104 is closed and "power off" switch 112 is opened, collector 106 of transistor 100, which is biased normally "off", and base 108 of transistor 102 are pulled "low", turning "on" transistor 102 and applying power to regulator 92. This power is maintained by voltage to regulator 92 being applied to base 110 of transistor 98, holding it "on" and latching transistor 102 "on". Power is removed by closing "power off" switch 112 and opening "power on" switch 104, which pulls base 114 of transistor 100 "low", switching transistor 100 "on" and biasing "off" transistor 102, which in turn removes power from regulator 92 and voltage from base 110 of latching transistor 98, breaking the latched condition of transistor 102.

Also illustrated in FIG. 6 is an example of how D.C. motor 34 is powered. Here, variable width pulses are applied to "drive up" or "drive down" inputs, generation of which will be explained, these inputs determining direction of rotation of motor 34 to operate fishing rod 20 up or down. These variable width pulses, when applied to base 117 of transistor 118, switch it "on" for the duration of each pulse, which lowers the potential on base 120 of transistor 122 during each pulse and increases the potential on base 124 of transistor 126, switching "on" transistors 122 and 126 for the duration of each pulse. This establishes a current path of one polarity through D.C. motor 34 via transistors 122 and 126, driving motor 34 in the "up" direction at a speed determined by the width of the pulses. Likewise, when pulses are applied to the "down drive" transistor 121, it is switched "on" for the duration of each pulse, in turn lowering potential at base 128 of transistor 130 and increasing potential at base 132 of transistor 134. This establishes a current path of an opposite polarity through motor 34 via transistors 130 and 134, driving motor 34 in the "down" direction, the speed determined by the pulse width. Alternately, drive of motor 34 may be done by a commercial solid-state device, such as an h-bridge motor driver, part number UND-2953b, manufactured by Sprague, Inc.

Pulses to drive motor 34 are generated by the circuitry shown in FIG. 7, wherein the "up" speed, in the preferred embodiment, is set during manufacture, and the "down" speed is set by the user. However, it is to be noted that with appropriate strapping, or by making potentiometer 174 accessible to the user, the "up" speed may also be varied. In this circuit, "drop faster" and "drop slower" switches 136 and 138, when momentarily closed, apply a "low" to inverters 140 or 142, respectively, which in turn applies a "high" to one of AND gates 144 or 146. These AND gates, when enabled by the "carryout/" ($\overline{CO}$) outputs of counter 150, which is normally "high" except when counter 150 recycles from a 1111 to a 0000 state, gate the "drop faster" or the "drop slower" information via OR gate 145 to up/down counter 150, with the up/down function thereof controlled by the Q output of FF 148, it being coupled to up/down input 152 of counter 150. The output count on terminals Q1–Q4 of counter 150 is integrated by resistors 154, 156, 158, and 160, and the resulting voltage is applied to inverting input 162 of amplifier 164, with an offset from potentiometer 166 applied to noninverting input 168. The resultant output from amplifier 164 is a D.C. voltage level between approximately 1 and 4 volts, which voltage level is proportional to the output count of counter 150. This voltage level is applied to the inverting input of a comparator 170, which compares this voltage level to a ramp waveform generated by a ramp generator 173 (schematically illustrated in dotted lines) and provides an output pulse having a width proportional to the count of counter 150. Additionally, comparator 170 is only responsive to the D.C. level from amplifier 164 when transistor 172 is biased "off", meaning that the jigging motion of fishing rod 20 is controlled by the D.C. level from amplifier 164 when moving downward, with the upward motion thereof controlled by a potential set by potentiometer 174 via transistor 172 when transistor 172 is biased "on". As stated, the "up" speed may be set during manufacture or by the user.

Figure 5:
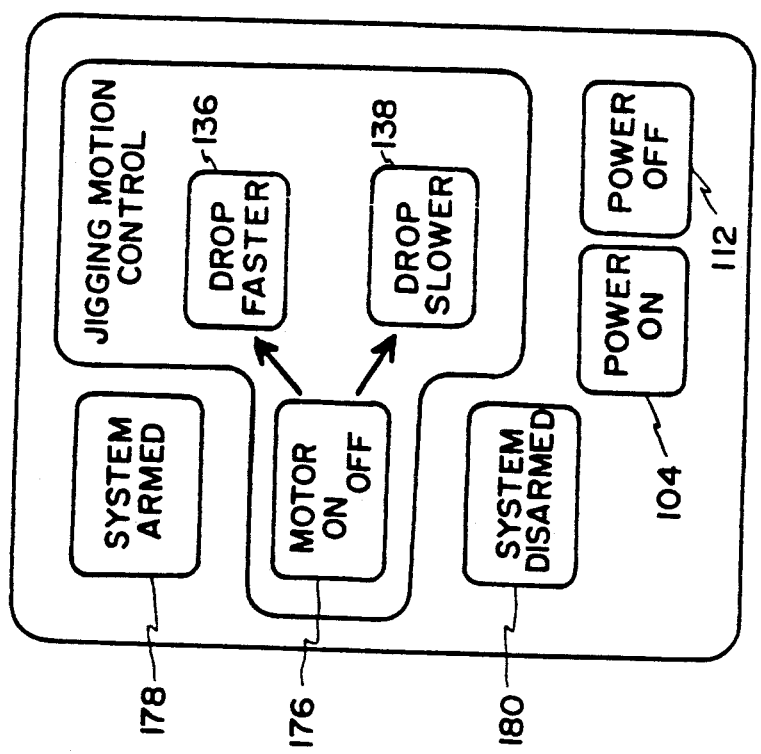
FIG. 5 is a plan view showing a control panel.

Turning now to FIG. 8, which illustrates control functions and logical control of the system, it is seen that inputs to this circuit consist of motor on/off switch 176, arm and disarm switches 178 and 180, respectively, these switches located on keypad 74 illustrated in FIG. 5, sensor trigger switch 26, constructed and located as described on fishing rod 20, and up and down limit switches 42 and 44, respectively, located and operated as described by motor 34. Initially, the variable width pulse from comparator 170 (FIG. 7) is applied to one input of AND gate 188, with this pulse gated through AND gate 188 by the Q output of D-type FF 190 connected as a toggle FF. As such, when motor on/off switch 176 is momentarily closed, a "high" is provided by the $\overline{Q}$ output of FF 190 to the D input 192, which in turn causes the Q output of FF 190 to go "high" and the $\overline{Q}$ output to go "low". This "high" from the Q output of FF 190 is coupled to the other input of AND gate 188, gating the pulse through AND gate 188. The pulse from AND gate 188 is then applied to one input of "up" and "down" drive AND gates 194 and 196, respectively. The other inputs of AND gates 194 and 196 are coupled to the $\overline{Q}$ and Q outputs, respectively, of D-type FF 198 which is controlled by limit switches 42 and 44. Switches 42 and 44 alternately toggle set and reset (S, R) inputs of FF 198 via inverters 199 and 201, which in turn alternately causes the Q and $\overline{Q}$ outputs of FF 198 to go "high", enabling the respective one of AND gates 194 and 196 to pass motor drive pulses to the appropriate input of the motor drive circuitry of FIG. 6. FF 198 is clocked by the Q output of FF 190, which is applied to the clock input of FF 198. It is noted that the $\overline{Q}$ output of FF 198 is also coupled to the base of transistor 172 (FIG. 7) so that when the "up" drive AND gate 194 is enabled, the width of pulses passed therethrough is determined by the voltage applied to the inverting input of amplifier 170 (FIG. 7) via transistor 172, driving rod 20 up at a rate determined by potentiometer 174. Next, the trigger circuit, which operates solenoid 56 for approximately two seconds in order to hook a fish, will be examined. A fish tugging at the bait or hook will open normally closed switch 26, which applies a "high" to both inputs of NAND gate 202, applying a "low" to one input of NOR gate 204. The other input of NOR gate 204 is pulled low by the $\overline{Q}$ output of FF 198, meaning that NOR gate 204 is enabled to pass the fish strike indication from switch 26 when the $\overline{Q}$ output of FF 198 is at a "low" state, as when up limit switch 32 has been momentarily closed, reversing motor 34 and dropping the bait at the user-selected speed. At the lower limit of travel of the bait, down limit switch 44 is closed, resetting FF 198 and applying a "high" to NOR gate 204, disabling gate 204 and preventing it from passing a fish strike indication. When enabled by a "low" on both inputs as described, NOR gate 204 applies a "high" to AND gate 206, which applies a clocking transition to clock input 208 of FF 210. FF 210 serves as a one-shot which energizes solenoid 56 via FET 86 (FIG. 6) for a two-second period, this time being determined by the charging rate of capacitor 211 coupled to the reset input of FF 210 which, when charged, resets FF 210. FF 210 is primed by FF 214, which provides a "high" from its Q output to the D input of FF 210, with FF 214 in turn being primed by the "low" on the $\overline{Q}$ output of motor on/off FF190. The signal on the D input of FF 210 is alternated between "high" and "low" states by armed/disarmed switches 178 and 180, switch 178, when closed, applying a "low" to NAND gate 179, passing a clock transition to the clock input of FF 214. This passes the "low" on the D input of FF 214 from FF 190 to the Q output of FF 214, energizing LED 215 and applying a "high" from the $\overline{Q}$ output of FF 214 to the D input of FF 210, priming FF 210. A "low" is applied to the D input of FF 210 from $\overline{Q}$ of FF 214 by OR gate 217, which applies a "high" to the set input of FF 214, reversing the logic states of the Q and $\overline{Q}$ outputs of FF 214, preventing a signal from FF 210 from energizing solenoid 56. Gate 217 receives a disarm signal either from disarm switch 180 or from the Q output of FF 210 which, when fired, sets FF 214 and applies a "low" to the D input of FF 210 to prevent repeated triggering of solenoid 56 by a hooked fish tugging on the fishing line, repeatedly opening and closing sensor switch 26. When switch 180 is closed, a "low" is applied to inverter 181, applying a "high" to OR gate 217, which in turn applies a "high" to the set input of FF 214 as described and initiates a "low" to the D input of FF 210. With FF 210 primed as described, a fish strike signal arriving at clock input 208 clocks FF 210 and applies the "high" from the D input to the Q output to FET 86 (FIG. 6), energizing solenoid 56 for a two-second period in order to "set" the hook in the fish. Concurrently, this same "high" is applied as described to OR gate 217, setting FF 214 and preventing repeated triggerings of solenoid 56. Additionally, this "high" is applied to reset FF 190, disabling motor 34 to stop the "jigging" action of the system. The logic circuits described above may also be implemented by means of a microcomputer chip.

In operation of the apparatus, the fisherman first clamps the line sensor to the rod and threads a fishing line through the sensor and rod eyes. A lure is then attached to the line. The rod is then placed in the holder arm, and the system is activated and adjusted by use of the control panel as shown in FIG. 6. The "power on" switch is first depressed, and the "motor on" button is pressed to begin rod motion. This causes the rod to move from a horizontal position to a 30-degree elevated position, resulting in a three-foot vertical rise and fall of the baited hook under typical conditions. Drop speed in the jigging cycle may then be adjusted by pressing the "drop faster" or "drop slower" switches as required. In this step, the speed of the motor is varied to provide an optimum rate which allows the bait to fall fast enough to achieve a fluttering motion while minimizing the amount of line slack. If excessive slack is present in the line, the sensor cannot effectively sense a strike. Having adjusted the rod speed for optimal bait presentation, the fisherman pulls more line off the reel as required for location of the lure at a desired fishing depth. The sensor is then activated by pressing the "system armed" switch, after which the rod continues to move at the set speed until a strike occurs as determined by the sensor. A signal from the sensor causes the solenoid to be energized, raising the rod and thereby setting the hook. The fisherman may then remove the rod from its holder and land the fish in a conventional manner. Upon activation of the solenoid, normal jigging motion of the rod stops.

The apparatus described above may be used for fresh and salt water fishing from boats, for ice fishing, and for fishing from docks and piers.

I claim:

1. Apparatus for supporting a fishing rod and for moving the same through repeated cycles of pivotal upward and downward movement comprising:
   a housing;
   a rod holder for removably supporting a fishing rod in longitudinal position and including an arm disposed for being pivoted around an axis transverse to said holder by means located in said housing;
   pivoting means comprising:
     a motor, and
     an inner shaft coupled to said motor for being driven thereby and defining said axis of rotation;
   an outer shaft fixedly connected to said arm and disposed around and concentric with said inner shaft for relative rotation with respect to the same;
   means for engaging said inner shaft to said outer shaft whereby said outer shaft may be driven and rotated through a predetermined, normal portion of a revolution;
   means for detecting relative angular positions of said inner shaft and said outer shaft with respect to one another;
   means for switching said motor responsive to said detected angular positions;
   tension-sensing means responsive to a bite of a fish on a line supported by said rod;
   means for providing a signal indicative of said sensed tension;
   means responsive to said signal for overriding said switching means; and
   means for driving said arm upward rapidly to an elevated position past its normal uppermost position.

2. Apparatus as defined in claim 1 wherein said means for engaging said inner shaft to said outer shaft comprises a pin affixed to said inner shaft and extending radially outward therefrom, and a slot in said outer shaft extending circumferentially and defining a path for movement of said pin through a predetermined portion of a revolution, said slot having an edge at at least one end thereof for being engaged by said pin whereby the pin may drive the outer shaft.

3. Apparatus as defined in claim 2 including a tab extending radially from said outer shaft generally opposite from said slot and means for engaging said tab for driving said tab circumferentially.

4. Apparatus as defined in claim 3 wherein said means for engaging said tab comprises a solenoid and a shaft driven by said solenoid.

5. Apparatus as defined in claim 4 wherein said means for detecting relative angular positions comprises a pair of limit switches having electrical contacts disposed at locations along said slot corresponding to predetermined normal ends of said portion of a revolution and a projection at the outer end of said pin for engaging said contacts.

6. Apparatus as defined in claim 5 wherein said contacts are spaced apart from one another at an angle of 30 degrees.

7. Apparatus as defined in claim 6 wherein said slot extends past one of said contacts for a distance such that ends of the slot are positioned at an angle of 45 degrees to one another.

8. Apparatus as defined in claim 7 including means for varying the speed of said motor.

* * * * *